UNITED STATES PATENT OFFICE.

GEORG EGLY, OF TREPTOW, NEAR BERLIN, GERMANY, ASSIGNOR TO GEBRUEDER SIEMENS & CO., OF LICHTENBERG, NEAR BERLIN, GERMANY, A COPARTNERSHIP.

PROCESS FOR THE PRODUCTION OF REFRACTORY, ELECTRICALLY-CONDUCTING MOLDED BODIES.

1,075,634.   Specification of Letters Patent.   Patented Oct. 14, 1913.

No Drawing.   Application filed June 25, 1912. Serial No. 705,829.

*To all whom it may concern:*

Be it known that I, GEORG EGLY, a citizen of the Empire of Germany, and residing at Treptow, near Berlin, Germany, have invented a certain new and useful Improved Process for the Production of Refractory, Electrically-Conducting Molded Bodies, of which the following is a specification.

My invention relates to a process for the production of refractory, electrically-conducting, molded bodies. This process may be divided into two parts.

In the first part of the process molded bodies are produced which essentially contain SiCO and in addition free carbon. The silicon and carbon are first mixed together, a binding agent, *e. g.* colophony or paraffin, can be added to make the mixture plastic, and the whole mass is then suitably formed. The formed body is then heated in an atmosphere of carbonic oxid or carbon dioxid at 1400° to 1500°. The action then taking place may be expressed by the following equation:—

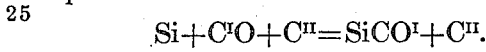

$$Si + C^IO + C^{II} = SiCO^I + C^{II}.$$

In the second part of the process the body so formed is heated at 1600° to 1700°, preferably in an electric furnace. The free carbon then combines with the oxygen in the SiCO and escapes as carbonic oxid, and there remains a body which essentially consists of silicic carbid. This reaction may be expressed by the following equation:—

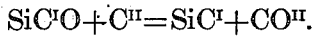

$$SiC^IO + C^{II} = SiC^I + CO^{II}.$$

The quantity of free carbon intimately mixed with the SiCO in the body after the first part of the process can be so regulated that, after the heating by the second part of the process, neither an excess of carbon nor any SiCO remains but the mass consists of nothing but CSi. In the first part of the process however more or less free carbon can be used, so that after the second part of the process there remains in the body a certain amount of free carbon or free SiCO, or on the other hand silicic carbid CSi may be incorporated with the molded body at the beginning. The finished body produced after the second portion of the process consists in the latter case partly of the CSi, which was incorporated in the mass in the first part of the process, and partly of the CSi which was not formed until the second part of the process. In a similar manner there can be added for the first part of the process other materials, *e. g.* clay, serving simultaneously as a binding agent.

The characteristic feature of the first part of the process is the presence of free carbon in intimate contact with the SiCO compound. Should the product arising from the first part of the process contain no free carbon, the mass of this body could certainly be reduced to SiC, but this would be only attainable with a very high temperature, about 2800°. Such processes are well-known. The reduction would however not take place without a considerable portion of the silicon being simultaneously vaporized. Apart from the remaining disadvantageous properties in the product so obtained, useful molded bodies cannot be made in this manner at all, because, by the silicon evaporating, both their form and their firmness are affected. On the other hand according to this novel process are obtained molded bodies of SiC having technically highly valuable properties. Such bodies have a uniform somewhat porous structure and are consequently not at all sensitive to temperature variations. Large and even quite sudden temperature changes have no injurious influence on them. Although these bodies are very hard they can be easily mechanically worked; they can for instance be filed, milled, sawed, ground and so forth. An essential advantage is their great stability even at temperatures as high as 1400°.

I claim:—

1. The process for producing refractory electric conductors which consists in heating a mixture of carbon and silicon in an atmosphere of carbon monoxid to obtain SiCO and in heating the SiCO in the presence of carbon to reduce the SiCO to SiC.

2. The process of producing an electric conducting body which consists in mixing silicon and carbon together in suitable quantities with a binder, in molding the body of said mixture, in heating said body in the presence of an oxid of carbon, and in subsequently heating the resultant product to a higher temperature.

3. The process of producing an electric conducting body which consists in molding the body of a plastic mixture of silicon and carbon, in heating said body to at least 1400° C. in the presence of an oxid of carbon to transform the mixture to SiCO+C and in subsequently heating the SiCO to at least 1600° C. to reduce the SiCO to SiC.

In testimony whereof I have signed my name to this specification in the presence of two witnesses.

GEORG EGLY.

Witnesses:
HENRY HASPER,
WOLDEMAR HAUPT.